Dec. 16, 1947.  C. D. LENNON  2,432,775
ROTATING DISC TYPE AIRCRAFT
Filed June 9, 1943          2 Sheets-Sheet 1
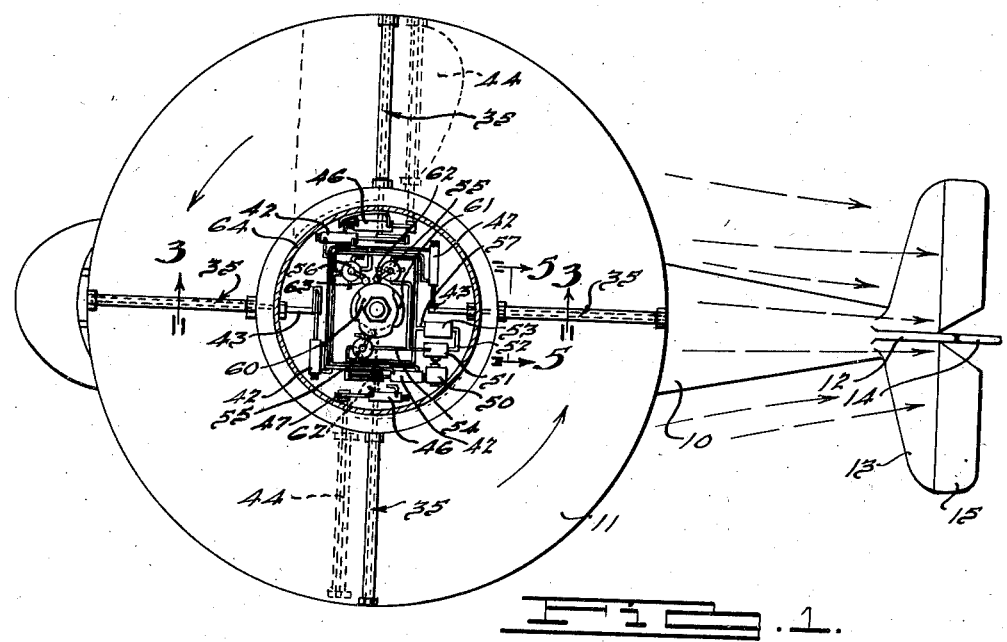
INVENTOR.
Clarence D. Lennon.
BY
Gray and Smith Dec. 16, 1947.    C. D. LENNON    2,432,775
ROTATING DISC TYPE AIRCRAFT
Filed June 9, 1943    2 Sheets-Sheet 2
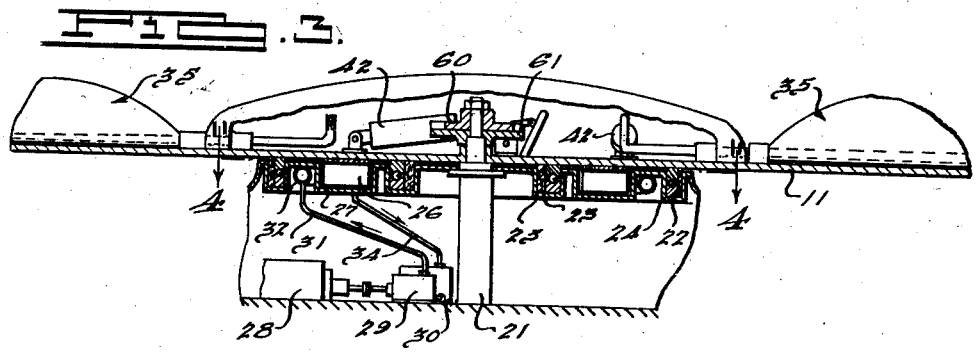
INVENTOR.
Clarence D. Lennon.
BY Gray and Smith Patented Dec. 16, 1947

2,432,775

UNITED STATES PATENT OFFICE 2,432,775

ROTATING DISC TYPE AIRCRAFT

Clarence D. Lennon, Detroit, Mich.

Application June 9, 1943, Serial No. 490,171

3 Claims. (Cl. 244—17)

1

The present invention relates to improvements in aircraft and particularly to improvements in aircraft of the vertically rising, rigid rotating wing type.

The principal objects of the present invention are:

1. To provide an aircraft which is lifted in a vertical plane by means of a rotating disc or plate which upon rotation creates a differential air pressure on its upper and lower face surfaces, the lower pressure being adjacent the central portion of the upper face surface, thereby causing the aircraft to rise or descend if desired, in a substantially vertical plane with a minimum of movement in a horizontal plane.

2. To provide an aircraft of novel and distinctive design in which a rigid rotating plate is utilized to perform the combined functions of a lifting wing and a propeller or air screw.

3. To provide an aircraft particularly characterized by its relatively high lifting efficiency which is combined with an improved and efficient propulsion system by means of which high speeds in a horizontal plane are permitted.

4. To provide an aircraft in which the lifting and propulsion of the aircraft is accomplished by the rotation of a rigid disc member which, in addition to generating lifting forces exerted in a vertical direction and propulsion forces exerted in a longitudinal direction, also generates gyroscopic forces which impart stability to the said aircraft.

5. To provide an aircraft of the rotating rigid wing type in which a rotating plate is driven by hydraulically actuated driving mechanisms which transmit a driving force to a plurality of points on the rotating plate and thus provides a balanced mechanism in which the tendency of the rotating plate member to rotate in other than a horizontal plane is effectively neutralized.

6. To provide an aircraft designed to operate on a principle of flight based upon the creation of a conically shaped zone of disturbance having its central reduced pressure area surrounding its central vertical axis which is coincident with a vertical line which passes through substantially the center of gravity of the aircraft.

7. To provide an aircraft construction utilizing a rotating rigid disc type of lifting member in which provision is made for varying the lifting effect of the said disc by varying its effective air contacting surface area so as to provide the maximum vertical lifting effect during take-off and landing, and upon adjustment to provide lesser lifting forces which are sufficient to sustain

2 the aircraft in the air during flight, the said adjustment also reducing resistance of the said disc to forward movement in a horizontal plane.

Other objects and advantages of this invention will appear in the following description and appended claims, reference being had to the accompanying drawings forming a part of this specification wherein like reference characters designate corresponding parts in the several views.

In the drawings:

Fig. 1 is a top plan view with parts broken away showing an aircraft embodying the principal features of the present invention.

Fig. 2 is a side elevation of the aircraft shown in Fig. 1.

Fig. 3 is an enlarged sectional view taken substantially on the line 3—3 of Fig. 1 looking in the direction of the arrows.

Fig. 4 is a sectional view with parts broken away taken substantially on the line 4—4 of Fig. 3 looking in the direction of the arrows.

Fig. 5 is a sectional view taken substantially on the line 5—5 of Fig. 1 looking in the direction of the arrows.

Fig. 6 is a side elevation with schematic indication of airflow and showing an aircraft of the present invention in flight.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Before describing the structural details of the present aircraft shown in the accompanying drawings, I desire to explain the theory of flight which is utilized therein. In view of the known tendency of science to re-examine its theoretical concepts in the light of the constantly accumulating scientific data, I do not desire to be limited strictly to the theory of flight herein outlined, inasmuch as there are a large number of physical forces of substantial magnitudes which are brought to bear upon the aircraft embodying the present invention, the exact nature of which can only be finally calculated and determined after exhaustive tests and careful study and correlation of the data so obtained.

The following theory and process is based upon basic observations and studies which I have made and from which I have formulated the general theory of flight which I shall now explain.

The aircraft herein disclosed embodying this theory has, it is believed, a higher efficiency in operation than previously known aircraft of comparable capacity and of conventional construction.

I have observed that when a flat disc is propelled through the air while rotating in a horizontal plane, it will travel a greater distance with the same propulsive force than if projected without rotation. I believe that this is due to the fact that the rotation of the mass utilizes in an efficient manner all the forces applied thereto which cause both its rotation and its propulsion through space. The mass, through its rotation, conserves the initial forces applied thereto and these conserved forces are made available to prolong its travel and overcome the inertia of the mass. This assists in maintaining the velocity of the mass so that it travels at a sufficient speed through the air for a greater horizontal distance before it is drawn to the earth by gravitational forces than is the case where an equal initial force is applied to the same disc which is propelled through space without rotation thereof.

The work required to set the disc in motion is partially stored in the disc as kinetic energy of rotation. The momentum of the rotating disc thus possesses a linear moment which is the product of its mass times its velocity, and an angular momentum which is the product of its rotary inertia and its angular velocity around a given axis. The propulsion force acting on the disc as a free mass changes its momentum and its rotary inertia in proportion to the mass and to the square of the distance of the mass from the axis of rotation. Thus a disc in rotation about an axis freely movable in either a horizontal or a vertical plane will continue in motion while a disc which is not so rotating will cease to continue in motion.

A familiar example of this principal is to be observed in the throwing of a discus. Here the discus is rotated in a substantially horizontal plane while it travels in an arcuate path through space. Another example of the principle is found in toy devices in which a high speed of rotation is imparted to a disc having vanes thereon and as the disc attains a sufficient velocity and is freed from a restraining axis, it will ascend vertically at a very high rate of speed and will descend slowly so long as there is a sufficient rotary motion in the member to exert a force which tends to retard the rate of descent under gravitational attraction.

In the aircraft of the present invention, I have utilized the principles of a rotating circular disc to provide for both vertical and horizontal movement of the airplane and I believe that the foregoing theories when applied to a structure as herein disclosed and claimed will result in an airplane having higher operating efficiencies than an aircraft of conventional design having a fixed rigid wing. I have increased the lifting and propulsive effect of this member by providing vanes at spaced points on the upper and lower surfaces of the disc so that I am enabled to cause such turbulence in the air as to create a conical zone of disturbance having its vortex and point of lowest pressure adjacent the point of the center of gravity of the aircraft of the present invention, and thus am enabled to impart efficiently a vertical lifting force to the aircraft. By my provision of movable vanes on the lower surface of the rotating disc I am enabled to control movement of the aircraft in a desired horizontal plane. The distance of such horizontal plane from the earth's surface is determined by adjustment of the movable vanes carried on the top surface of the rotating rigid disc and the speeds of rotation imparted thereto.

Referring to the drawings, the aircraft fuselage 10 is provided with a rotating disc 11, which will be hereafter more fully described, and which in the preferred embodiment of my invention takes place of both the wing construction and the air screw or propeller of conventional aircraft design. The fuselage 10 is provided with a vertical stabilizer 12, which extends a substantially equal distance above and below the center line of the fuselage 10, and acts to stabilize the movement of the aircraft in a horizontal plane. A horizontal stabilizer 13 is provided for stabilizing the movement of the aircraft in a vertical plane. The vertical stabilizer 12 is provided with a movable rudder section 14, which acts to guide the movement of the aircraft in a horizontal plane. The horizontal stabilizer 13 is provided with a movable rudder section 15 for directing movement of the aircraft in a vertical plane.

Body landing wheels 16 and a nose wheel 17 of any desired conventional construction are mounted respectively on the retractable landing members 18 and 19. The construction herein shown is that of a conventional "tricycle" type of landing gear, and while this is a preferred construction, it is to be distinctly understood that any suitable type of landing gear may be employed.

The fuselage 10 has a pilot compartment 20 which is located forward of the center of gravity of the aircraft. The center line of a rigid post or pillar 21, on which the rotating disc 11 is mounted for rotation is mounted so that the center of gravity of the aircraft falls on said center line. The rigid post or pillar 21 is secured to the structural framework of the aircraft fuselage and the lifting of the fuselage by forces transmitted through the rotating disc is accomplished through the said rigid post or pillar 21. The rotating disc 11 is mounted for rotation on the rigid post or pillar 21 by means of any suitable type of bearing construction and is locked against vertical movement relative thereto. Thus a lifting force exerted by the rotating disc 11 is transmitted through the rigid post or pillar 21 to the structural framework of the fuselage 10.

The rotating disc 11 is supported by bearing members 22 and 23 which are spaced concentrically with respect to the post or pillar 21 and with regard to each other. The bearing members 22 and 23 are rotatably retained in bearing races 24 and 25, which are formed in a structural portion of the fuselage 10 adjacent the top thereof. If desired, any suitable type friction reducing bearings may be employed in connection with these bearing members, such for example as ball or roller bearings, which are supplied with lubricant from any suitable source (not shown).

Rotation of the disc 11 may be accomplished by any desired means, such for example as electrical, mechanical or hydraulic transmission of power from a power source.

The preferred form of construction such as is here shown and will be now particularly described is a hydraulic transmission. In this instance the lower face of the disc 11 carries a plurality of arcuate turbine blades 26, which are mounted in the concentric race 27. Movement of the disc 11 is accomplished by fluid pressures generated by an engine 28 of any desired type and exerted on the turbine blades 26. The engine 28 is preferably a liquid cooled internal combustion engine connected in driving relation to a pressure pump 29, which draws the hydraulic fluid from a reservoir 30. The hydraulic fluid under pressure is supplied to the turbine blades 26 through a pressure line 31 to a concentric header 32 having a plurality of symmetrically disposed jets 33 discharging high pressure fluid for contact with the turbine blades 26. The spent hydraulic fluid is returned from the race 27 to the reservoir 30 through the return line 34.

The rotating disc 11 as previously mentioned acts both as the lifting medium for movement in a vertical plane and as an air screw for propulsion of the aircraft in a horizontal plane. The disc 11 is provided with a plurality of movable radial vanes 35, which are symmetrically disposed on the top thereof as shown in detail in Fig. 1. As shown in Fig. 5 each of the movable vanes 35 consists of a hollow tubular shaft 36, which is journaled for rotation in bearings 37 carried on the plate 11. A hollow fin 35 is secured to the tubular shaft 36 and has a suitable interior reenforcing frame member 39. The fin 35 is covered with a suitable air impermeable covering. The hollow fin 35 is so constructed as to provide a flat air engaging surface 40, and a curved air foil surface 41. Each of the movable radial vanes 35 may be rotated through an arc of approximately 90 degrees to the top surface of the plate 11. When rotated so that the center line of the vane 35 is approximately normal to the plane of the top surface of the disc 11, the disc and vanes will exert the maximum lifting effect on the aircraft. In this position upon rotation of the disc 11 a relatively large surface is brought in contact with the air and a turbulent condition is set up in the air immediately on top of the plate 11. After the aircraft is air borne and has attained a flying speed, the movable vanes 35 may be moved so that the center lines of the vanes extend at angles less than 90 degrees to the face of the top surface of the rotating disc 11.

In these positions shown by the intermediate dotted lines in Fig. 5, less of the surfaces of the members 35 is available for contact with the air, and the resultant lifting effect is less than the maximum lifting force exerted by the members when fully raised. If desired the members 35 may be rotated so that the center lines thereof lie in a plane substantially parallel to the top surface of the disc 11 as shown by the dotted line position. When in this position, the disc 11 and the vanes 35 are exerting their minimum lifting effect on the aircraft. In this position, the resistance to movement of the aircraft forwardly in a horizontal plane is decreased and the turbulent effect of the disc 11 on the air is at its minimum.

The movement of the vanes 35 relative to the disc 11 to vary the lifting force exerted by the disc 11, is actuated and controlled by any suitable means, such for example as a plurality of hydraulically actuated cylinders 42, having movable pistons therein, which are carried on the rotating disc 11. Each of these pistons is connected with a crank arm 43, which is connected operatively with each of the hollow tubular shafts 36, so that upon movement of the crank arms 43, the shafts 36 are rotated as may be desired for the positioning of the members 35 relative to the disc 11.

In order to provide for forward movement of the aircraft in a horizontal plane, a plurality of symmetrically disposed downwardly extending movable vanes 44 are provided on the lower face of the disc 11. These vanes may be constructed in a manner similar to that previously described in connection with the top movable vanes 35.

Adjacent each vane 44 is a stepped member 45 which is secured to the lower face of the disc 11, and acts to preliminarily baffle or direct the air currents as the disc is rotated so that the air currents are deflected in a downward direction prior to the time when they are contacted by the flat air engaging surface of the adjacent movable vane member 44. Each of the vane members 44 is moved from its open depending position as shown in Fig. 2, to a folded position so as to permit its movement over the top of the fuselage 10. It is held in the folded position as it travels through the arc of movement on the opposite side of the fuselage 10 so that the movement of the vane 44 for driving the aircraft forwardly in a horizontal plane occurs only on one side of the fuselage 10. The movement of the vanes 44 from their open to their closed position is accomplished by a plurality of hydraulically actuated cylinders 46, which are mounted on the rotating disc 11. Each of the cylinders is provided with a movable piston which is connected with a crank arm 47 connected to each of the movable vanes 44 for translating the linear movement of the piston into rotary movement of the connected vane 44.

Power for the movement of the vanes 35 and the vanes 44 is supplied by a suitable hydraulic power circuit which is a separate unit from the hydraulic circuit previously discussed, and which is mounted to rotate as a unit with the rotary disc 11 and the vanes 35 and 44. This hydraulic power circuit comprises a motor 50, which may be of any suitable type, which is connected in driving relation with the hydraulic pressure pump 51, which is connected by the supply duct 52 with a reservoir 53, from which hydraulic fluid is supplied to the said pressure pump 51. Power lines 54 lead to control valves 55, which control the flow of hydraulic fluid to the pistons 46, and to a control valve 56 which controls the supply of hydraulic fluid to the cylinders 42.

From the control valves 55 and 56 suitable hydraulic power supply lines lead to the respective cylinders and are arranged so as to discharge fluid under pressure selectively to the sides of the movable piston therein so as to cause its movement in a desired direction. From these cylinders suitable hydraulic lines 57 are provided and act as return lines for returning the fluid to the reservoir 53.

The valves 55 and 56 are separately controlled preferably by the separate control cam members 60 and 61, which are secured to the top of the post or pillar 21. Cam followers 62 and 63 are provided on valves 55 and 56 respectively, and operate the valves 55 and 56 when moved relative to the cams 60 and 61. The cam 60 is preferably a contour cam which is secured to the post or pillar 21 so that as the disc 11 rotates, the cam follower 62 is moved on the contour of the cam 60, and operates the valves 55 in a regular cycle so as to control the flow of hydraulic fluid to the pistons to raise and lower the vanes 44 at predetermined points in the rotation of the disc 11.

The cam 61 is an adjustable cam which may be adjusted as desired to vary selectively the opening and closing of the valve 56, or the holding of the valve in a predetermined position so as to lock the hydraulic fluid in the lines and thus to hold the fins 35 in any desired operating position relative to the top surface of the rotating disc 11.

The central portion of the disc 11 is provided with a hub-like covering 64, which not only encloses the operating mechanism previously described, but also acts as an overhead reenforcing member for the central portion of the disc 11 so as to counteract the tendency of the disc to be dished or bulged in its central portion. The hub-like member 64 also acts to transfer the loading uniformly over the central portion of the disc 11.

In the several views, I have indicated schematically by arrows the direction of the air currents which are generated by the aircraft in flight. As shown in Fig. 6, the rotation of the disc 11 creates a whirling turbulent condition of the air above the disc 11 in the form of a conical zone of disturbance, the vertical axis of which is located at the center of gravity of the aircraft. An area of diminished pressure is created inside the said conical zone of disturbance and the greatest pressure differential is in the area immediately adjacent the vertical axis thereof. Thus the air under pressure whirling in the spiral path indicated in the spiral line and arrows, surrounds an area of diminished pressure which causes an updraft and an upward rush of air into this zone of decreased pressure. Creation of this condition in the air is accelerated by the shape of the movable vanes 35, which as shown, have their greatest surface area adjacent the circumference of the disc 11 but tapers downwardly toward the hub portion 64 of the disc 11. Thus the greatest volume and area of air set in motion is that adjacent the outer circumference of the disc 11 and this volume and area decreases adjacent the hub portion 64. Thus the shape of the members 35 combined with the rotation of the disc 11, tend to move the greatest volume of air the greatest distance at the point of the greatest angular movement of the members 35 through the air, which is at a point lying adjacent the circumference of the disc 11. By this means the location of the turbulent zone is definitely maintained so that its maximum lifting force is exerted on the hub portion 64 at the center of gravity of the aircraft. Due to the shape of the members 35, the greatest volume and, therefore, the greatest weight of air is located adjacent the circumference of the rotating disc 11. The suspension of the fuselage 10 at its center of gravity from the axis of the disc 11 counteracts the forces which are created by the rotation of the disc and which would tend to cause the hub portion 64 to be pulled out of alignment in an upwardly direction due to the combined action of the air forces on the circumference of the disc 11 tending to deflect it downwardly and the diminished pressure zone created adjacent the top of the hub member 64 tending to deflect this portion of the disc upwardly. It will be seen that this construction thus utilizes the forces created by the rotation of the disc 11 to counteract the forces which otherwise would pull portions of the member 11 out of their alignment in a fixed horizontal plane.

The normal tendency of a rotating disc member, such as the disc 11, is to cause the fuselage 10 of the aircraft to oscillate about the post or lifting pillar 21. To counteract this effect, I have provided a vertical stabilizer 12, which extends an equal distance above and below the longitudinal center line of the fuselage 10. Direction of the aircraft in a horizontal plane is accomplished by movement of the rudder portion 14 of the vertical stabilizing member 12.

Movement of the aircraft in a vertical plane is controlled by the vertical stabilizer 13 and the movable rudder portion 15 associated therewith.

In operation, the aircraft when in the landed position as shown in Fig. 2 is first caused to ascend substantially vertically by rotation of the disc member 11 with the top fin members 35 in their fully raised position. This creates the maximum condition of turbulence in the air above the disc 11 and the updraft thus created as indicated by the upwardly directed arrows in Fig. 2, exerts a lifting effect on the rotating disc 11 causing the plane to begin its vertical ascent. At the same time the movable vane 44 in the lowered position as shown in Fig. 2 has exerted a forwardly pushing effect on the air as indicated by the horizontally extending arrows in this figure. This causes a forward movement of the aircraft in a horizontal plane. The resulting movement of the aircraft is along an angular line which is not necessarily at right angles to the landing surface but is instead an intermediate line which lies between a horizontal and a vertical line. Thus the ascent of the aircraft may result from both the vertical lifting force and the horizontal impelling force, both of which are created by the rotation of the disc 11. If desired, provision may be made to hold the moveable vane 44 in its fully retracted position for the entire rotation of the disc 11. In this event, the ascent of the aircraft will be substantially on a vertically extending line. In either event, the angle of ascent is much steeper, that is, it lies nearer the vertical line, than is the case with conventional aircraft using a rigid wing and a rotating air screw or propeller for the lifting and propulsion of the aircraft. The lifting force and the angle of ascent or descent also is controlled in part by the horizontally extending rudder portion 15, which may be so adjusted as to increase or decrease, as may be desired, the angle of ascent or of descent of the aircraft.

If desired, a conventional type of propeller or air screw may be utilized in conjunction with the rotating disc member 11, in which event the disc member 11 would provide the lifting force for the aircraft while the air screw would provide for the propulsion of the aircraft in a horizontal plane. In this event, the moveable vanes 44 would be eliminated therefrom.

Also it is to be understood that the horizontal stabilizing member 12 extending above and below the horizontal center line of the fuselage 10, may be employed with other types of aircraft where it is desired to counteract a tendency of the aircraft to oscillate in a horizontal plane about its center of gravity. The stabilizing member 12, may if desired, extend only above the center line of the fuselage 10.

Any desired means may be employed to secure the rotation of the disc 11. The hydraulic construction herein disclosed has the desirable feature of providing a substantially uniform distribution of the driving forces so as to assure a balanced rotation of the disc 11. By this construction the power thrust on the vanes on one side of the disc is counteracted by an equal power thrust on the vanes on the opposite side. It is to be understood that any desired number of power jets may be utilized so as to provide a uniform and steady flow of power to the rotating disc 11.

While I do not desire to be limited to any dimensions or operational characteristics of a device embodying the present invention, I believe that a desirable combination is a disc approximately thirty feet in diameter, which will rotate at approximately 30 R. P. M. Due to the large circumference of such a rotating disc 11, the effect on the air of the movement of the disc at such a relatively slow rate is comparable to the lifting effect obtained by moving a smaller volume of air at a higher rate of speed.

The aircraft embodying the present invention is such that the fuselage portion 10 may be laid out to conform to the most efficient form of air flow so as thus to reduce to a minimum the resistance to horizontal movement. This also permits the most efficient utilization of the interior of the fuselage to secure a uniform distribution of the weight of the fuselage and its contents in relation to the center of gravity at the axis of the rotating lifting disc.

I claim:

1. An aircraft lifting and propulsion unit comprising a power driven rotating disc adapted to be secured to an aircraft fuselage with its axis located on a line passing through the center of gravity of the aircraft, and having a convex central hub portion, a plurality of radially disposed vanes pivotally mounted on the top surface of said disc for movement about their longitudinal axes, said vanes extending outwardly from the periphery of said convex central hub portion of said disc to points adjacent the circumference of said disc, power actuated means for moving said vanes about their longitudinal axes to control the amount of surface in contact with the air upon rotation of said disc, and power means for rotating said disc.

2. Aircraft propulsion means comprising a power driven rotating disc adapted to be secured to the fuselage of an aircraft with its axis located on a line passing through the center of gravity of said aircraft, a convex central hub housing secured to said disc, a plurality of radially disposed movable vanes pivotally mounted on the top surface of said disc and extending radially outward from the periphery of said convex central hub housing to points adjacent the circumference of said disc, and power actuated means controlled manually for effecting and controlling the pivotal movement of the said radially disposed vanes relative to the top surface of said rotating disc to vary the effective air contacting surfaces thereof.

3. Aircraft propulsion means comprising a rotating disc adapted to be secured to the aircraft fuselage with its axis located on a line passing through the center of gravity of the aircraft, a convex central housing secured to said disc, means carried by said disc for controlling the forces generated by the rotation thereof to effect movement of the aircraft in both a horizontal and a vertical plane, said means comprising a plurality of radially disposed movable vanes pivotally mounted on the top surface of said disc and extending from the periphery of said convex housing to points adjacent the circumference of said disc, hydraulically actuated means for moving said vanes relative to the surface of said disc to vary the effective air contacting surfaces thereof, means for rotating said disc comprising an hydraulic power transmission system constructed and arranged to transmit a force to said disc to effect its rotation, a plurality of radially extending steps on the under side of said disc, an extensible and retractible vane secured on the underside of said disc adjacent each of said steps and hydraulically actuated means for extending and retracting said last named vanes in timed relation to the rotation of said disc.

CLARENCE D. LENNON.

REFERENCES CITED

The following references are of record in the file of this patent:

UNITED STATES PATENTS

| Number | Name | Date |
|---|---|---|
| 1,254,496 | Goldsworthy | Jan. 22, 1918 |
| 1,295,571 | Neiswander | Feb. 25, 1919 |
| 1,974,738 | Cierva | Sept. 25, 1934 |
| 2,303,695 | Johnson | Dec. 1, 1942 |
| 2,340,427 | Putt | Feb. 1, 1944 |

FOREIGN PATENTS

| Number | Country | Date |
|---|---|---|
| 362,683 | France | Apr. 11, 1906 |
| 489,293 | Great Britain | July 22, 1938 |